United States Patent [19]

Prevotat

[11] Patent Number: 4,961,892
[45] Date of Patent: Oct. 9, 1990

[54] DEVICE FOR EXTRUDING HOMOGENEOUS PLASTIC ARTICLES AND PROCESS MANUFACTURING HOMOGENEOUS ARTICLES THEREWITH

[75] Inventor: Bernard Prevotat, Le Chesnay, France

[73] Assignee: Atochem, Paris, France

[21] Appl. No.: 341,543

[22] Filed: Apr. 21, 1989

[30] Foreign Application Priority Data

May 4, 1988 [FR] France ................. 88 05999

[51] Int. Cl.⁵ ............................................. B29C 47/20
[52] U.S. Cl. ................................ 264/209.8; 264/40.6; 425/380; 425/382.4; 425/466; 425/467
[58] Field of Search ............... 264/209.8, 209.1, 564, 264/176.1, 40.6; 425/461–462, 466–467, 378.1, 326.1, 379.1, 380, 382.4

[56] References Cited

U.S. PATENT DOCUMENTS

| 3,193,879 | 7/1965 | Corbett | 425/461 |
| 3,709,645 | 1/1973 | Mraz | 425/467 |
| 3,932,102 | 1/1976 | Rosenbaum | 425/466 |
| 4,063,865 | 12/1977 | Becker | 425/467 |
| 4,201,532 | 5/1980 | Cole | 425/326.1 |
| 4,216,253 | 8/1980 | Bonnebat et al. | 425/144 |
| 4,509,907 | 4/1985 | Ratheiser | 264/209.8 |

FOREIGN PATENT DOCUMENTS 1291433A 2/1987 U.S.S.R. .............................. 425/461

Primary Examiner—Jeffery Thurlow
Attorney, Agent, or Firm—Sigalos, Levine & Montgomery

[57] ABSTRACT

A distribution head having an inlet for accepting a stream of fluid plastic and an outlet for discharging the stream, two pairs of discrete channels in the distribution head extending from the input to the output for splitting the streams into corresponding discrete substreams, selected ones of the channels being of predetermined different lengths to provide lateral mixing of the stream as it passes through the head. The invention also includes a combination of the distribution head and a connected extrusion tool and the process of making homogeneous plastic articles, particularly pipes.

11 Claims, 2 Drawing Sheets 4,961,892

DEVICE FOR EXTRUDING HOMOGENEOUS PLASTIC ARTICLES AND PROCESS MANUFACTURING HOMOGENEOUS ARTICLES THEREWITH

BACKGROUND OF THE INVENTION

The present invention pertains to a device and a process for extruding homogeneous plastic articles, particularly pipes and will be described in connection therewith.

Plastic pipes are currently used in mains because of their light weight, their ease of installation and connection and their corrosion resistance.

These plastic pipes, which have been known for several decades, are always manufactured according to the original principle using a device as shown in FIG. 1.

This device of extrusion head, fed with molten plastic by an extruder to which it is attached in the axis of extrusion, is formed by two principal parts between which circulates the molten material up to the outlet of the extrusion die. The central part forming the internal blank of the pipe comprising the punch and mandrel is schematically formed by two conical parts joined to each other in their largest base, the punch being the diverging cone relative to the outlet of the extruder and the mandrel being the part converging toward the outlet of the die. This mandrel is attached by means of fins to the part forming the external part of the device so as to leave a free tubular conduit between the two parts of the outlet of the extruder at the outlet of the die of the said device.

This device has changed little over time, whereas the performance of the extruder to which it is attached has progressively increased and they have ever increasing material throughputs. Despite the care taken by the manufacturers of these machines, this leads to notable temperature differences in the stream of molten plastic discharged by these extrusion machines, causing considerable differences in the viscosity of the plastic between the different points of the device. These variations in viscosity generate fluctuations in throughput and lead to appreciable deviations in thickness over the finished article such as the pipe. To remedy this disadvantage, the machine designers have been steadily increasing the volumes of material contained in this device to reduce these deviations in temperatures or even to correct the thickness deviations at the outlet of the device by various automatic centering systems, either by mechanical displacement of the punch and mandrel relative to the die or by creating different temperatures at the periphery of the die. Such correction systems require elaborate means for continuous measurement of the thickness over the circumference of the finished pipe.

SUMMARY OF THE INVENTION

The device according to the present invention makes it possible to continuously regulate the temperature of the material discharged by the extruder by causing the total material to absorb the local temperature variations occurring in the streams of material. The temperature of the material in the device naturally becomes homogeneous, so that means for centering the finished article such as a pipe become unnecessary, aside from the initial start-up setting of the production line. This device also makes it possible to increase the throughput of the extruder while ensuring the manufacture of a homogeneous article such as a pipe in which the wall thickness differences remain rather small.

Briefly stated, the present invention comprises a distribution head having an inlet for accepting a stream of fluid plastic and an outlet for discharging said stream of fluid plastic, channel means in said distribution head extending from said input to said outlet including means within said channel means for accepting said stream of fluid plastic and for dividing said stream into a plurality of substreams, at least two of said substreams being of predetermined different lengths.

The invention also comprising a device comprising such distribution head and an extrusion tool and the process for making homogeneous plastic articles, particularly pipe, as hereinafter set forth.

DETAILED DESCRIPTION

As in the devices intended for the manufacture of multilayer pipes, the device according to the present invention, fed by an extruder, has a distribution head at the outlet of the extruder. In the manufacture of multilayer pipes this distribution head serves to reunite the streams of materials of different and was a priori unnecessary in the manufacture of homogeneous pipes. However, the distribution head of the present invention makes it possible, as will be shown below, to cause the total amount of the molten plastic material to absorb the local temperature variations caused by the extruder in making homogeneous pipe.

The device comprises a distribution head possessing heating and adjusting means, which makes it possible to subdivide the principal stream leaving the extruder into two streams. Each of these streams feeds an annular conduit. The stream of molten material is thus divided into two tubular conduits which can join each other within the device, but they preferably join each other at the extrusion tool consisting of the mandrel and the die. The value of such a device can be understood if one knows that according to the prior art device, a temperature difference in the stream of molten material leaving the extruder will be transmitted axially in the entire extruder, unless external compensating means are used, up to the outlet of the die, which leads to the above-mentioned disadvantages. In the device according to the present invention, the temperature disturbance in the stream is suppressed. Since the stream is subdivided into two, the temperature difference will initially be transmitted axially in one of the streams, but will undergo a radial deviation when the material enters one of the two annular conduits. In addition, this temperature difference will effectively influence the distribution of each of the streams, but since this distribution takes place in an annular pattern, the two streams will oppose each other, and the temperature fluctuations will be cancelled at the point in which the two tubular conduits meet each other. Finally, the temperature anomalies are previously substantially attenuated due to the subdivision of the stream into two, which makes it possible to considerably enlarge the surface area of spread of the molten material in the device.

In a simplified manner, this device is characterized in that the feed with material arriving from the extruder is subdivided in a distribution head into two feeds for the two independent annular conduits which preferably join each other in the extrusion tool. The two feeds are calculated so as to permit the circulation of two streams at practically equal flow rates and they are preferably directed toward the outside essentially opposing each other.

Figure 1:
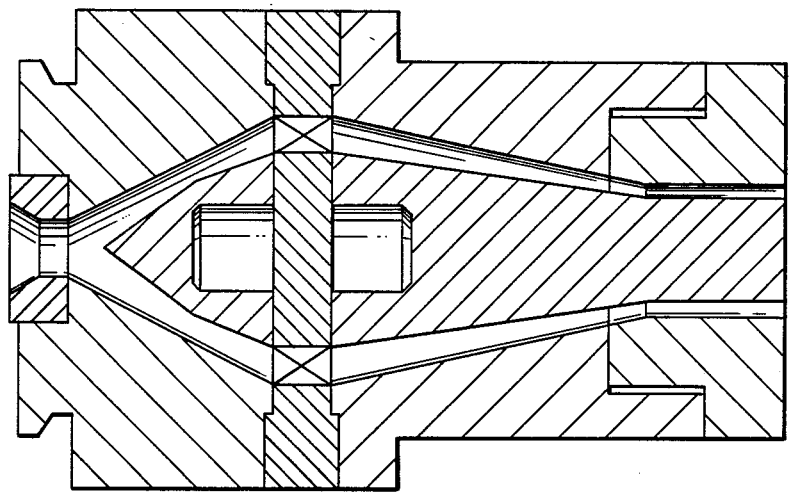
FIG. 1 is an elevational sectional view of a prior art device.
Figure 2:
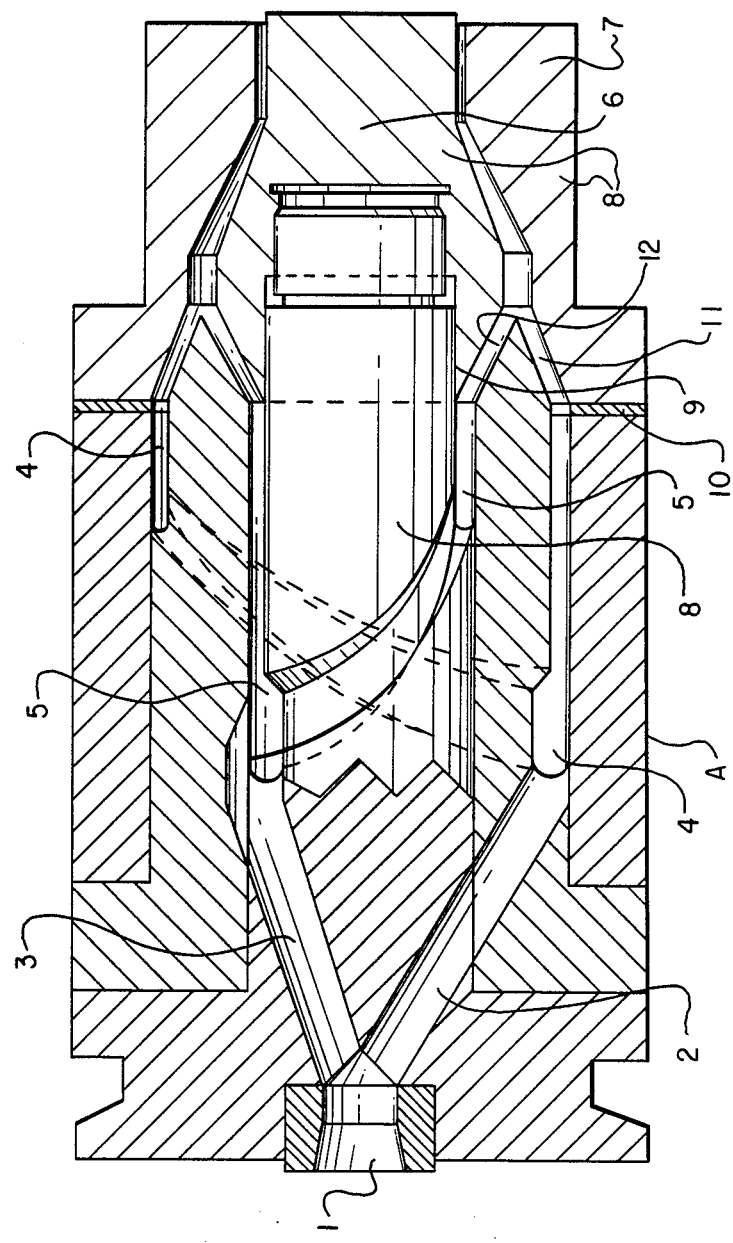
FIG. 2 is an elevational sectional view of a device according to the present invention.

The attached FIG. 2 helps better understand the present invention. This figure details and illustrates a section of a type of device. This device is formed by the assembly of the distribution head (A) and the extrusion tool (B). The distribution head comprises an inlet or feed duct (1) connected to the outlet of an extruder (not shown) preferably essentially disposed in the axis of the tool, the said duct having means for subdividing plastic coming into the device into two essentially divergent feed ducts (2) and (3) for two converging toward each other up to the point of meeting or outlet of the distribution head that is preferably essentially located at the level of the extruding tool. The feed ducts and annular conduits form channels extending through the distribution head. The extruding tool is known to consist of a conventional mandrel (6) and die (7) system.

Another advantage of the device is the elimination of the support fins of the prior-art central part formed by the punch and the mandrel. According to the present invention, the annular conduits are not in direct contact with the outlet conduit of the extruder, but are connected to this conduit via two divergent ducts. This type of arrangement makes it possible to directly fix the central part (8), which also maintains the mandrel of the extrusion tool, to the external part of the device without the use of fins.

The fastening means (9) and (10) of adjustable thickness make it possible to move the mandrel in the central part by variable extends to increase or reduce the volume of the annular conduits in their output or zones of convergence (11) and (12) and (11a) and (12a). This control of the volume of these conduits influences the setting of the streams of material in the divergent ducts (2) and (3).

The device according to the present invention makes it possible to manufacture homogeneous single-layer pipes of very good appearance, excellent mechanical characteristics and only slight deviations in thickness over the entire wall. This regularity of the pipe wall thickness is achieved without the need to recenter the extrusion tool as a function of the temperature variations in the incoming stream of molten plastic.

More particularly, the process for manufacturing homogeneous pipes according to the present invention consists of:
(i) feeding a distribution head (A) comprising a feed duct (1) connected the outlet of the extruder with molten plastic by means of an extruder, whereby the said duct, which is subdivided into two divergent ducts (2) and (3), permits the plastic to flow in the molten state in two superimposed annular conduits (4) and (5) converging toward each other up to the point of meeting that is located in the device preferably essentially at the level of the extrusion tool and
(ii) joining the two streams of plastic in the said meeting point, preferably between the mandrel (6) and the die (7) of the extruding tool.

As in the case of a conventional extrusion process, the device is maintained at the temperature suitable for the transmission of the plastic used.

In addition to the regularity of thickness, the pipe obtained is also perfectly homogeneous according to this process. Contrary to what might be expected, the merger of the material leaving the two annular conduits is not visible in the finished pipe at all. There is complete cohesion between the two streams during their passage in the extrusion tool.

Using the device and the process according to the present invention under the extrusion conditions suitable for every particular plastic being considered, it is possible to manufacture any known type of plastic pipe.

While the invention has been described in connection with a preferred embodiment, it is not intended to limit the scope of the invention to the particular form set forth, but, on the contrary, it is intended to cover such alternative, modifications, and equivalents as may be included within the spirit and scope of the invention as defined by the appended claims.

What is claimed is:

1. A distribution head for compensating for differences in a stream of plastic received from an extruder comprising an inlet for receiving a stream of fluid plastic and an outlet for discharging said stream, channel means in said distribution head extending from said inlet to said outlet, means including dividing means within said channel means for dividing said stream into at least two pairs of sidestreams, each pair of sidestreams having a first sidestream and a second sidestream, each of said first sidestreams extending by discrete paths separately and directly through said distribution head and each of said second sidestreams extending by discrete curved paths separately and indirectly through said distribution head whereby said indirect paths are longer than said direct paths.

2. The distribution head of claim 1 wherein said indirect paths are arcuate for most of their lengths.

3. In combination, a distribution head having an inlet for accepting a stream of fluid plastic and an outlet for discharging said stream of fluid plastic, and extrusion tool means connected to said outlet, channel means in said distribution head extending from said inlet to said outlet including accepting and dividing means within said channel means for accepting said stream of fluid plastic and for dividing said stream into a plurality of discrete substreams at least two of said substreams being of predetermined different lengths, said dividing means dividing said stream into at least tow pairs of discrete substreams, each pair having a first discrete substream and a second discrete substream, each of said first discrete substreams extending by direct paths separately and directly through said distribution head and each of said second substreams extending by indirect curved paths separately and indirectly through said distribution head whereby said indirect paths are longer than said direct paths.

4. The combination of claim 3 wherein said indirect paths are arcuate for most of their length.

5. The combination of claim 4 further including substream combining means for combining the first substream of one of said two pairs of substreams with the second substream of the other of said two pairs of substreams.

6. The combination of claim 5 further including other substream combining means for combining the second substream of said one of said two pairs of substreams with the first substream of said other of said two pairs of substreams.

7. A process for manufacturing homogeneous plastic articles comprising feeding a stream of fluid plastic into a distribution head, splitting said stream into a first substream and a second substream, splitting said first substream into a third substream and a fourth substream, splitting said second substream into a fifth substream and a sixth substream, conducting said third substream and said fifth substream separately over paths of a first predetermined length, conducting said fourth substream and said sixth substream separately over paths of a second predetermined different length, combining said third substream with said sixth substream, and combining said fourth substream with said fifth substream.

8. The process of claim 7 further including the step of combining the combination of said third substream and said sixth substream with the combination of said fourth substream and said fifth substream.

9. The process of compensating for temperature differences in a stream of fluid plastic in the manufacture of homogeneous plastic pipe comprising splitting said stream into a first substream and a second substream, splitting said first substream into a third substream and a fourth substream, splitting said second substream into a fifth substream and a sixth substream, conducting said third substream and said fifth substream over direct separated paths of predetermined length, conducting said fourth substream and said sixth substream over separated arcuate paths of greater predetermined length, combining said third substream with said sixth substream, and combining said fourth substream with said fifth substream.

10. The method according to claim 9 further including the steps of converging the combination of said third substream and sixth substream with the combination of said fourth substream and said fifth substream.

11. The method according to claim 10 further including the steps of combining said combination of said third substream and said sixth substream with said combination of said fourth substream and said fifth substream and passing said combined streams through an extrusion tool to form the plastic pipe.

* * * * *

UNITED STATES PATENT AND TRADEMARK OFFICE
CERTIFICATE OF CORRECTION

PATENT NO. : 4,961,892
DATED : October 9, 1990
INVENTOR(S) : Prevotat, Bernard

It is certified that error appears in the above-identified patent and that said Letters Patent is hereby corrected as shown below:

Column 4, line 47 cancel "tow" and substitute --two--.

Signed and Sealed this

Seventh Day of January, 1992

Attest:

HARRY F. MANBECK, JR.

Attesting Officer — Commissioner of Patents and Trademarks

UNITED STATES PATENT AND TRADEMARK OFFICE
CERTIFICATE OF CORRECTION

PATENT NO. : 4,961,892

DATED : October 9, 1990

INVENTOR(S) : Prevotat

It is certified that error appears in the above-identified patent and that said Letters Patent is hereby corrected as shown below:

On the title page assignee should read
--[73] assignee:-- Societe Alphacan, Celle Saint-Cloud, France--

Signed and Sealed this

Eighteenth Day of August, 1992

Attest:

DOUGLAS B. COMER

Attesting Officer

Acting Commissioner of Patents and Trademarks